United States Patent Office 3,454,668
Patented July 8, 1969

3,454,668
ISOMERIZATION OF 2,4,4-TRIMETHYL-2-PENTENE TO 2,5-DIMETHYL HEXENES
Ronald O. Downs, St. Louis, and Raymond A. Franz, Kirkwood, Mo., assignors to Monsanto Company, St. Louis, Mo., a corporation of Delaware
No Drawing. Filed Oct. 31, 1966, Ser. No. 590,524
Int. Cl. C07c 5/28, 5/26
U.S. Cl. 260—683.2
10 Claims

ABSTRACT OF THE DISCLOSURE 2,4,4-trimethyl-2-pentene is isomerized by contacting it with a modifying agent which is hydrogen bromide, hydrogen chloride, hydrogen iodide, hydrogen sulfide, or compounds or elements which will form hydrogen bromide, hydrogen chloride, hydrogen iodide, hydrogen sulfide or combinations thereof under the reaction conditions. The contacting is carried out at a temperature in the range of 200 to 750° C. and at a pressure of 100 to 10,000 p.s.i.g. The inclusion of the modifying agent increases the conversion of the 2,4,4-trimethyl-2-pentene and the yield of 2,5-dimethyl hexenes.

---

The present invention relates to a process for the isomerization of specific hydrocarbons. More particularly, the present invention relates to a process for the conversion of 2,4,4-trimethyl-2-pentene to 2,5-dimethyl hexenes by non-catalytic isomerization.

One of the methods for obtaining p-xylene in relatively pure form is by the dehydrocyclization of 2,5-dimethyl hexenes, however, this method of producing p-xylene has found little prominence primarily because of the difficulty of obtaining 2,5-dimethyl hexenes. One proposed source of the 2,5-dimethyl hexenes is the isomerization of 2,4,4-trimethyl-2-pentene. This latter compound is one of the principal dimer products of the acid catalyzed dimerization of isobutylene. By proper control of the conditions of such dimerization reactions, this compound may be produced in large quantities. It has been proposed to isomerize the 2,4,4-trimethyl-2-pentene to 2,5-dimethyl hexenes by thermal means. However, such thermal isomerization has been found to be deficient with respect to both conversion and yields of 2,5-dimethyl hexenes.

It is an object of the present invention to provide a new and improved process for the isomerization of specific hydrocarbons. Another object of the present invention is to provide a new and improved process for the non-catalytic isomerization of hydrocarbons. An additional object of the present invention is to provide a new and improved non-catalytic, thermal process for the isomerization of 2,4,4-trimethyl-2-pentene to 2,5-dimethyl hexenes. Additional objects will become apparent from the following description of the invention herein disclosed.

The present invention, which fulfills these and other objects, is a process which comprises subjecting a hydrocarbon feed containing 2,4,4-trimethyl-2-pentene to a temperature within the range of 200 to 750° C. and a pressure of 100 to 5,000 p.s.i.g. in a thermal reaction zone in the presence of a modifying agent which is a compound selected from the group consisting of hydrogen bromide, hydrogen chloride, hydrogen iodide, hydrogen sulfide, combinations thereof, and compounds and elements which under the conditions of the thermal reaction zone will form a compound selected from the group consisting of hydrogen bromide, hydrogen chloride, hydrogen iodide, hydrogen sulfide, and combinations thereof. By means of the process of the present invention substantially improved conversions of 2,4,4-trimethyl-2-pentene to 2,5-dimethyl hexenes are obtained. In addition, a substantially improved yield of 2,5-dimethyl hexene is obtained. Also, by the process of the present invention, it is possible to isomerize the 2,4,4-trimethyl-2-pentene to 2,5-dimethyl hexenes in the presence of 2,4,4-trimethyl-1-pentene and other impurities often found in the acid dimer of isobutylene.

To further describe and to specifically illustrate the present invention, the following examples are presented. These examples are in no manner to be construed as limiting the present invention.

EXAMPLE I

To a reaction chamber having a length of 12 inches and an internal diameter of approximately 0.36 inch, was charged 2.1 grams of 2,4,4-trimethyl-2-pentene. An amount of benzenethiol, as the modifying agent, such as to represent 1 mole percent of the resulting mixture of 2,4,4-trimethyl-2-pentene and benzenethiol was then added. The reaction chamber was sealed and heated to a temperature of 400° C. and maintained at that temperature for approximately 30 minutes. The pressure during this period was the autogenous pressure of the reactants under the conditions of the reaction zone. After the 30-minute period, the reaction chamber was opened and a product recovered. The recovery was 100 percent. Analysis of the recovered product demonstrated a conversion of the 2,4,4-trimethyl pentene to 2,5-dimethyl hexenes of 23.5 percent with a yield of the 2,5-dimethyl hexenes of 52.3 percent.

EXAMPLE II

Example I was repeated with the exception that no modifying agent was used and the amount of 2,4,4-trimethyl-2-pentene charged was 2.15 grams. From this experiment, approximately 93 percent of the amount of the material charged was recovered. The recovered material was found to represent a conversion of 2,4,4-trimethyl-2-pentene to 2,5-dimethyl hexenes of 10.5 percent and to represent a yield of 2,5-dimethyl hexene of 36.2 percent.

From a comparison of Examples I and II above, the improvement in the thermal isomerization of 2,4,4-trimethyl-2-pentene to 2,5-dimethyl hexenes obtainable by the process of the present invention is readily apparent. The converison obtained in the experiment described in Example I above, which was carried out in accordance with the present invention, was 123.8 percent greater than that obtained in Example II which was not carried out in accordance with the present invention. Also, the yield of 2,5-dimethyl hexene obtained in Example I is approximately 44.5 percent greater than that obtained in Example II.

Though preferably the 2,4,4-trimethyl-2-pentene which is used as the feed to the non-catalytic isomerization process of the present invention is relatively pure, such is not required for carrying out the present invention. One of the most common and difficulty separable impurities usually found in 2,4,4-trimethyl-2-pentene obtained from the acid dimerization of isobutylene is 2,4,4-trimethyl-1-pentene. The present isomerization process may be carried out in the presence of this impurity. As a practical matter, however, the 2,4,4-trimethyl-2-pentene feed to the present process generally will not contain greater than 10 percent by weight of the 2,4,4-trimethyl-1-pentene isomer as an impurity. In addition to the bond isomer, other impurities normally found in the acid dimer of isobutylene such as paraffin hydrocarbons of 4 to 8 carbon atoms, isobutylene trimers, tetramers and the like may be present in the 2,4,4-trimethyl-2-pentene feed. However, such impurities are most often maintained below 2.0 percent by weight of the total feed.

The modifying agents useful in the present invention comprise materials which under the conditions of the thermal reaction zone will decompose or otherwise form hydrogen chloride, hydrogen bromide, hydrogen iodide, hydrogen sulfide or combinations therof. The term "agent" is meant to include, in the sense under herein, elemental sulfur, chlorine, bromine, and iodine as well as chemical compounds of which these elements are a part. The compounds which contain chlorine, bromine, iodine or sulfur may be either organic or inorganic compounds and may contain in addition to these elements such other elements as carbon hydrogen, oxygen, or nitrogen. If the compound is an organic compound, it may be saturated or unsaturated, aliphatic or aromatic, straight-chain, branched-chain or cyclic in structure. Among the halogen-containing compounds within the scope of the present invention are the following non-limiting examples:

| Column I | Column II | Column III |
| --- | --- | --- |
| 2-bromopropane | Bromobenzene | Chloroethanoic acid. |
| 2-chloropropane | Chlorobenzene | Dibromoethanoic acid. |
| 1-iodopropane | m-Dichlorobenzene | Di-iodoethanoic acid. |
| 1-bromobutane | o-Dichlorobenzene | α-Chloroacetamide. |
| 1-chlorobutane | p-Dichlorobenzene | α-Bromoacetanilide. |
| 2-iodobutane | m-Dibromobenzene | Benzoyl chloride. |
| 1-bromopentane | o-Dibromobenzene | Benzoyl bromide. |
| 2-bromopentane | p-Dibromobenzene | Benzoyl iodide. |
| 3-chloropentane | Iodobenzene | Butanoyl chloride. |
| 2-iodopentane | o-Iodotoluene | Butanoyl bromide. |
| 3-bromohexane | m-Iodotoluene | Butanoyl iodide. |
| 2-bromohexane | p-Iodotoluene | 2-chloro-1,4-benzenediol. |
| 2-iodohexane | o-Chlorotoluene | 2-bromo-1,4-benzenediol. |
| 2-bromo-4-methyl hexane. | m-Chlorotoluene | 1-chloro-4-nitronaphthalene. |
| 3-chloroheptane | p-Chlorotoluene | Ethylene chlorobromide. |
| 3-bromoheptane | o-Bromotoluene | Diphenoyl chloride. |
| 2-iodoheptane | m-Bromotoluene | Succinyl chloride. |
| 2-bromo-4-ethyl-hexane. | p-Bromotoluene | 4-chloroquinoline. |
| 4-bromooctane | 3,5-dibromotoluene | Ethanoyl iodide. |
| 3-chlorooctane | o-Bromo-chlorobenzene. | Hexanoyl chloride. |
| 2-iodooctane | m-Bromo-chlorobenzene. | Decanoyl chloride. |
| 1-bromononane | p-Bromo-chlorobenzene. | 2-bromoethanol. |
| 2-chlorodecane | 2-bromonaphthalene | 2-chloroethanol. |
| 2-bromodecane | 1-chloronaphthalene | Bis-β-chloroethylether. |
| 2-bromo-6-methyldecane. | 1,3-dichloro-naphthalene. | Chloromethoxy methane. |
| 4-iodoundecane | 2-chlorodiphenyl | Cyclohexylbromide. |
| 1-bromododecane | 4-chlorodiphenyl | Carbon tetrachloride. |
| Hydrogen chloride | Chlorine gas | 2-chloro-3-hexene. |
| Hydrogen bromide | Bromine gas | 2-bromo-2-pentene. |
| Hydrogen iodide | Iodine | 3-bromo-4-octene. |

The halogen-containing compounds most useful in the practice of the present invention are those which contain a halogen from the group consisting of bromine, chlorine and iodine and the elements carbon and/or hydrogen. These compounds are the halogen-substituted hydrocarbons and hydrogen halides. There is no critical limit to the molecular weight of the modifying compound other than one of practicality in handling. It will generally be somewhat preferred, from a purely practical standpoint, to use those compounds which are normally liquid, with those that are normally gaseous being even more preferred. In the practice or the present invention, the preferred halogen compounds are the mono- and di-halogen substituted hydrocarbons of no more than 6 carbon atoms and the hydrogen halides. Though all of the halogens from the group consisting of bromine, chlorine and iodine are operable in the present invention, it is generally preferred to use those compounds containing chlorine and bromine with bromine being preferred over chlorine.

Among the sulfur-bearing compounds useful in the present invention are the following non-limiting examples:

| | |
| --- | --- |
| Allyl sulfide | Benzoyl disulfide. |
| Benzyl disulfide | Benzyl sulfide. |
| 2-methyl-1-butanethiol | 3-methyl-1-butanethiol. |
| 2-methyl-2-butanethiol | Tert-octanethiol. |
| Butyl disulfide | Butylsulfide. |
| 1,2-ethanedithiol | Ethanethiol. |
| Ethylene sulfide | Ethyl disulfide. |
| Ethyl sulfide | Furfuryl mercaptan. |
| 1-heptanethiol | 1-hexanethiol. |
| Isoamyl disulfide | Isoamyl sulfide. |
| Isobutyl sulfide | Methyl disulfide. |
| Methyl sulfide | 2-naphthalenethiol. |
| 1-naphthalenethiol | 1-pentanethiol. |
| Phenyl disulfide | 1-propanethiol. |
| 2-methyl-1-propnethiol | 2-propanethiol. |
| 2,2'-thiodiethanol | Thiophene. |
| Acetyl disulfide | Benzenesulfonic acid. |
| o-Bromo-benzene-sulfonic acid | p-Bromo-benzene-sulfonic acid. |
| p-Chloro-benzene-sulfonic acid | o-Formyl-benzene-sulfonic acid. |
| Methyl-benzene-sulfonic acid | Benzyl sulfoxide. |
| 2,2'-bithiophene | Butyl sulfate. |
| Butyl sulfone | Butyl sulfoxide. |
| Dithio-carbamic acid | Thiol-carbamic acid. |
| Thiono-carbamic acid | Trithio-carbonic acid. |
| Dithiol-carbonic acid | Cetyl sulfate. |
| Dodecyl sulfate | 1,2-ethanedisulfonic acid. |
| Ethionic anhydride | Ethyl sulfite. |
| Ethyl sulfone | Ethyl sulfoxide. |
| Ethyl sulfuric acid | Methanethiol. |
| Methyl sulfoxide | β,β'-Dichloroethyl sulfide. |
| 2-bromothiophene | 2-chlorothiophene. |
| 2,5-dimethylthiophene | 2,5-diiodothiophene. |
| 2,3-dimethylthiophene | Vinyl sulfide. |
| 1-decanol sulfate | Methyl sulfate. |
| Methyl sulfite | Dichlorophenylphosphine sulfide. |
| Bis-(β-dichloroethyl)sulfide | Ethyl methyl sulfide. |
| Tetradecyl sulfate | Thionaphthene. |
| Thionaphthenequinone | 2-methylthiophene. |
| 3-methylthiophene | α-Toluenethiol. |
| Elemental sulfur | Sulfur dissolved in dialkylalkanolamine. |

As noted from the above list of compounds, the sulfur-bearing modifying agents may contain such elements other than sulfur as carbon, hydrogen, oxygen, nitrogen, chlorine, bromine, iodine, and the like. Among the preferred modifying compounds are sulfur and such sulfur-bearing compounds as mercaptans or thiols both aliphatic and aromatic, hydrogen sulfide, thio ethers and thiourea. Also within this list of preferred compounds are those derived from dissolving sulfur in tertiary amines at elevated temperatures. The preferred modifying compounds are sulfur and sulfur-bearing compounds containing the additional elements of carbon and/or hydrogen. When using these sulfur-bearing compounds containing carbon and hydrogen, it is generally preferred that they contain no greater than 20 carbon atoms, with those containing less than 10 carbon atoms being preferred.

It is, of course, not necessary that the modifying agent be limited to a compound which will form one of the above-mentioned hydrogen halides or a sulfur compound which will form hydrogen sulfide. It is within the scope of the present invention that a combination of the two types of compounds may be used. For example, the present invention contemplates the use in combination as a modifying agent such compounds as bromopropane and benzyl mercaptan. Also, one compound may contain both halogen atoms and sulfur atoms and may suffice as a combination modifying agent. Such a compound is 2-bromothiophene.

The amount of modifying agent necessary in carrying out the process of the present invention is such as to cause a molar concentration in the reaction mixture of no less than 0.01 mole percent. Seldom will the mole percent of the modifying agent in the reaction mixture exceed 50 percent. A preferred amount of modifying agent is that amount which will produce a concentration of modifying agent in admixture with the 2,4,4 - trimethyl - 2 - pentene within the range of 0.5 to 5.0 mole percent.

Temperatures at which the present invention is most often operated are within the range of 200 to 750° C. A preferred range of temperatures for operating the process of the present invention is 350 to 550° C. Generally, the pressures of the process of the present invention are in excess of 100 p.s.i.g. but less than 10,000 p.s.i.g., usually within the range of from about 200 to about 5,000 p.s.i.g. In many instances, the autogenous pressure resulting from application of the above defined temperatures will fall within these pressure ranges and may suffice. Residence time of the 2,4,4 - trimethyl - 2 - pentene within the reaction zone will seldom be greater than 60 minutes or less than one second. Preferably, however, the residence time is within the range of 0.5 to 45 minutes.

The method whereby the modifying agent and the 2,4,4 - trimethyl - 2 - pentene feed are brought into contact with one another is critical only to the extent that there should be a thorough, intimate, contact between the two. The 2,4,4 - trimethyl - 2 - pentene feed and the modifying agent may be concurrently reduced into a reaction zone which may be a batch container or a reaction chamber designed for continuous flow. If the process of the present invention is carried out as a continuous process, the feed and modifying agent may be introduced into contact with one another by concurrent, cross-current or counter-current flow.

What is claimed is:

1. A process for the isomerization of 2,4,4 - trimethyl-2-pentene to 2,5-dimethyl hexenes which consists essentially of subjecting a hydrocarbon feed containing 2,4,4-trimethyl - 2 - pentene to a temperature within the range of 200 to 750° C. and a pressure of 100 to 10,000 p.s.i.g. in a thermal reaction zone and in contact with a modifying agent which is a compound selected from the group consisting of hydrogen bromide, hydrogen chloride, hydrogen iodide, hydrogen sulfide, combinations thereof and compounds and elements which under the conditions of the thermal reaction zone will form a compound selected from the group consisting of hydrogen bromide, hydrogen chloride, hydrogen iodide, hydrogen sulfide, and combinations thereof.

2. The process of claim 1 wherein the residence time of the 2,4,4 - trimethyl - 2 - pentene feed within the reaction zone is within the range of one second to 60 minutes.

3. The process of claim 1 wherein the 2,4,4 - trimethyl - 2 - pentene feed contains no greater than 10 percent by weight of 2,4,4 - trimethyl - 1 - pentene as an impurity.

4. The process of claim 1 wherein the molar concentration of modifying agent in admixture with 2,4,4 - trimethyl - 2 - pentene feed is within the range of 0.01 to 50 percent.

5. The process of claim 1 wherein the modifying agent is a halogen-substituted hydrocarbon of no greater than 6 carbon atoms and in which the halogen is one selected from the group consisting of bromine, chlorine, iodine and combinations thereof.

6. The process of claim 1 wherein the modifying agent is selected from the group consisting of hydrogen bromide, hydrogen chloride, hydrogen iodide, and combinations thereof.

7. The process of claim 1 wherein the modifying agent is selected from the group consisting of elemental sulfur and sulfur bearing compounds selected from the group consisting of mercaptans, hydrogen sulfide, thioethers, and thioureas.

8. The process of claim 1 wherein the modifying agent is a sulfur substituted hydrocarbon of no greater than 20 carbon atoms.

9. The process of claim 1 wherein the temperature is within the range of 350 to 550° C.

10. The process of claim 4 wherein the modifying agent is benzenethiol.

References Cited

UNITED STATES PATENTS

| 2,386,934 | 10/1945 | Cramer | 260—683.2 |
| 2,764,624 | 9/1956 | Dixon et al. | 260—683.2 |
| 2,554,251 | 5/1951 | Hudson | 260—683.2 |
| 2,666,798 | 1/1954 | Condon | 260—683.2 |
| 3,250,821 | 5/1966 | Bullard | 260—683.2 |

FOREIGN PATENTS

| 458,870 | 8/1949 | Canada. |

DELBERT E. GANTZ, *Primary Examiner.*

G. J. CRASANAKIS, *Assistant Examiner.*